(12) United States Patent
Brafford

(10) Patent No.: US 6,438,146 B1
(45) Date of Patent: Aug. 20, 2002

(54) MULTIPLEXED ASYNCHRONOUS SERIAL COMMUNICATION SYSTEMS METHODS AND COMPUTER PROGRAM PRODUCTS

(75) Inventor: Keith R. Brafford, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/059,509

(22) Filed: Apr. 13, 1998

(51) Int. Cl.[7] .................................................. H04J 3/02
(52) U.S. Cl. ...................... 370/537; 370/468; 709/238
(58) Field of Search ................................ 370/389, 391, 370/401, 468, 412, 535, 538; 708/233, 230, 521; 310/392, 466, 537, 540, 542; 709/238

(56) References Cited

U.S. PATENT DOCUMENTS

| | | | | |
|---|---|---|---|---|
| 4,718,062 A | * | 1/1988 | Andersen | 370/535 |
| 5,610,914 A | * | 3/1997 | Yamada | 370/535 |
| 5,630,065 A | * | 5/1997 | Ishii | 370/535 |
| 5,663,962 A | * | 9/1997 | Caire et al. | 370/535 |
| 5,680,403 A | | 10/1997 | Riello et al. | 370/352 |
| 5,745,491 A | * | 4/1998 | Ando et al. | 370/538 |
| 5,768,265 A | * | 6/1998 | Toyohara | 370/535 |
| 5,914,962 A | * | 6/1999 | Fimoff et al. | 370/538 |
| 6,151,333 A | * | 11/2000 | Arimilli et al. | 370/537 |
| 6,157,674 A | * | 12/2000 | Oda et al. | 370/538 |
| 6,175,577 B1 | * | 1/2001 | Van Den Heuvel | 370/535 |

OTHER PUBLICATIONS

Website documentation at www.debnet.com/datasheet/asd-s.html.

* cited by examiner

Primary Examiner—Ricky Ngo
Assistant Examiner—Phuc Tran
(74) Attorney, Agent, or Firm—Myers Bigel Sibley & Sajovec; Jeanine S. Ray-Yarletts

(57) ABSTRACT

A method, apparatus and program product for increasing the performance of an asynchronous serial communications port by mulitplexing a plurality of communication pipes established between the user application programs and the serial port. To the user application programs, each pipe is treated as a separate output port. A thread of code is started associated with each pipe. On receipt of data by any pipe, all of the pipes are checked to determine if a predetermined amount of data has been queued for any pipe. If so, a packet of data is created containing queued data from all pipes or null data for a pipe with no queued data. A bitmap is generated specifying which fields contain data and which contain null data. Each field is associated with a specific pipe. The packet is routed over the computers serial port to a multiplexer which reads the bitmap, unpacks the data, and routes any contained data to the output port of the multiplexer which is associated with the respective pipe. Each output port of the multiplexer is independently configurable to operate at a baud rate (or other communication parameter such as parity) which is user selectable. A multiplexer circuit is also provided.

33 Claims, 10 Drawing Sheets

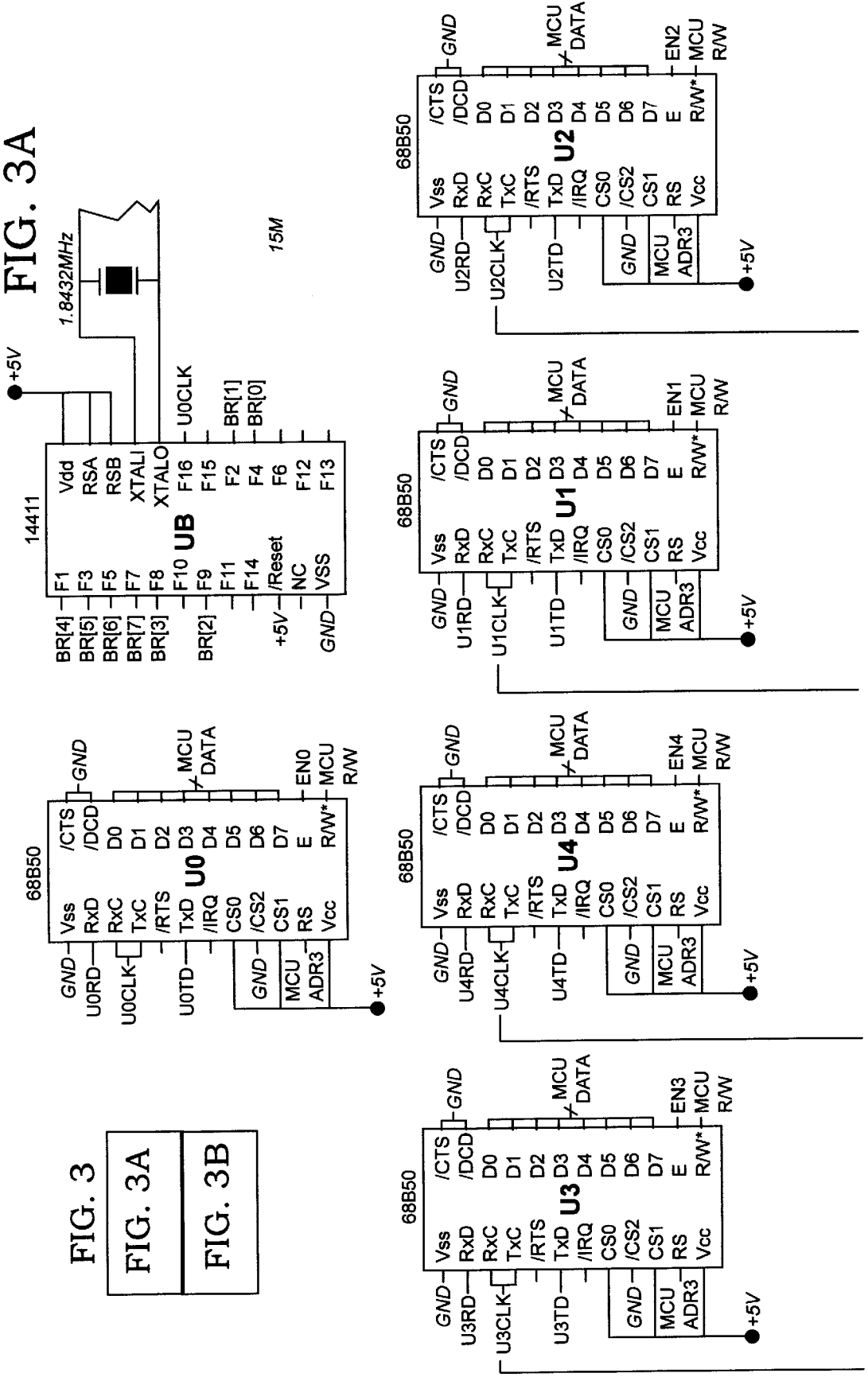

FIG. 9

Packet From Multiplexer

| Header | Data | | | | | | | | Bitmap |
|--------|------|---|---|---|---|---|---|---|--------|
| K | 0 | 1 | 2 | 3 | 0 | 1 | 2 | 3 | msb...lsb |

MULTIPLEXED ASYNCHRONOUS SERIAL COMMUNICATION SYSTEMS METHODS AND COMPUTER PROGRAM PRODUCTS

FIELD OF THE INVENTION

The present invention relates to asynchronous serial communication systems and methods. More particularly the present invention relates to communications between computers and serial communication devices using asynchronous serial communication

BACKGROUND OF THE INVENTION

Perhaps the most common method of communication for computers today is through serial ports. The basic communication structure for a computer having an asynchronous serial communication port for communicating with external devices through modems interfacing to remote devices such as printers or other computers is depicted in FIG. 1. In FIG. 1 a computer 10 communicates, through a serial port connected to modem 12, with remote devices 20 over a communication link 14. Remote devices 20 receive the communication via modem 16. Communication link 14, at the physical layer, is typically a public switched telephone network for at least some portion of the communication link. The computer 10 communicates with the remote devices 20 using one of a variety of known serial communication protocols at a selected baud rate for transmission and reception by modems 12, 16.

Serial communication using personal computers has changed greatly since such computers were originally introduced. In the early days of personal computing, the speeds of modems and other peripheral devices typically matched the ability of their host computer to maintain reliable and efficient connections to them. Over time, however, the processing power of personal computers has increased much more rapidly than modem communication speed capabilities. The increase in modem baud rate capability has been slowed by bandwidth limitations of the physical infrastructure (in particular of the public switched telephone network) and by signal/noise constraints. Accordingly, there has been an increase in the speed of the serial communications ports on computers that has not been matched by an equivalent increase in modem speed. Therefore, serial communication ports on personal computers are typically under-utilized as they are capable of operating faster than any one modem can operate.

OBJECTS AND SUMMARY OF THE INVENTION

In view of the above limitations it is one object of the present invention to provide systems, methods and computer program products for increasing the utilization of serial ports on computers.

It is a further object of the present invention to provide serial communications multiplexing systems, methods and computer program products which interface substantially seamlessly with applications executing on a computer.

It is an additional object of the present invention to provide serial communications multiplexing systems, methods and computer program products which require only limited hardware to upgrade existing computers and networks, while providing independent control of each channel.

In view of these and other objects, the present invention provides methods for increasing the utilization of an asynchronous serial communications port by mulitplexing a plurality of communication pipes established between the user application programs and the serial port. To the user application programs, each pipe is treated as a separate output port. A thread of code is started associated with each pipe. On receipt of data by any pipe, all of the pipes are checked to determine if a predetermined amount of data has been queued for any pipe. If so, a packet of data is created containing queued data from all pipes or null data for a pipe with no queued data. A bitmap is generated specifying which fields contain data and which contain null data. Each field is associated with a specific pipe. The packet is routed over the computer's serial port to a multiplexer which reads the bitmap, unpacks the data, and routes any contained data to the output port of the multiplexer which is associated with the respective pipe. Each output port of the multiplexer is independently configurable to operate at a baud rate (or other communication parameter such as parity) which is user selectable.

Received data at the multiplexer is similarly packeted for transmission to the computer including a field associated with each output port of the multiplexer. A bitmap is generated indicating which fields contain data and which fields contain null data. A read thread of code executing on the computer receives the packet via the serial port, reads the bitmap, reconstructs the data, and routes the data to the pipe which is associated with the output port of the multiplexer receiving the data.

A multiplexer circuit is provided which supports independent communication setting operations of the output ports as well as packetizing and reconstructing of data for multiplexing the single serial port from the computer. A clock generator provides a plurality of communication clock (baud) rates to the inputs of multiplexers with the rate applied to each asynchronous communication device in the circuit being selected by latches set by a controller which in turn selects the output of multiplexers which are coupled to the clock inputs of the asynchronous communication chips.

In one embodiment of the present invention, a method is provided for providing cooperative processing in an object oriented communication system. The object oriented communication system includes an object oriented computing environment executing on a computer which includes a multiplexer server object for connecting a plurality of applications generating data for transmission over an asynchronous serial communication port to the asynchronous serial communication port. The multiplexor server object includes a first communication pipe object for receiving data from a first one of the plurality of applications and routing data to the asynchronous serial communication port and a second communication pipe object for receiving data from a second one of the plurality of applications and routing data to the asynchronous serial communication port. The first communication pipe object executes in the object oriented computing environment to thereby perform operations including receiving data from a first one of the plurality of applications and queuing received data for routing to the asynchronous serial communication port. The first communication pipe object also determines if a selected amount of received data has been queued by one of the first or the second communication pipe objects and generates a first packet of data for routing to the asynchronous serial communication port when the selected amount of received data has been queued and routes the first packet of data to the asynchronous serial communication port. The second communication pipe object executes in the object oriented computing environment to thereby perform operations including receiving data from a second one of the plurality of applications and queuing received data for routing to the asynchronous serial communication port. The second communication pipe object also determines if the selected amount of received data has been queued by one of the first or the second communication pipe objects and generates a second packet of data for routing to the asynchronous serial communication port when the selected amount of received data has been queued and routes the second packet of data to the asynchronous serial communication port.

In a further embodiment of the present invention, the asynchronous serial communication port is coupled to a multiplexer having a plurality of output ports. The first packet of data and second packet of data are routed to the multiplexer through the asynchronous serial communication port. The first packet of data routed to the multiplexer contains a field associated with each of the plurality of applications. A bitmap field identifying associated fields of the first packet of data which contain data from an associated one of the plurality of applications and associated fields which contain null data is generated. The bitmap field is routed with the first packet of data to the multiplexer. Preferably, the bitmap field is routed to the multiplexer before the first packet of data.

In a further aspect of the present invention, the multiplexer server object includes a multiplexer control object for establishing communications settings for the plurality of output ports. The multiplexer control object executes in the object oriented computing environment to thereby perform operations including; receiving communications settings for at least one of the plurality of output ports; packetizing the received communication settings; routing the packet of received communication settings to the multiplexer through the asynchronous serial communication port; and configuring the at least one of the plurality of output ports responsive to the packet of received communication settings. In one aspect of this embodiment, each of the plurality of output ports has an associated baud rate and a first of the plurality of output ports is configured to a first associated baud rate and a second of the plurality of output ports is configured to a second associated baud rate different from the first associated baud rate.

In yet another aspect, the multiplexer server object further includes a read object for receiving data from the multiplexer through the asynchronous serial communication port and providing the received data to at least one of the plurality of applications. The read object executes in the object oriented computing environment to thereby perform operations including: receiving a data packet from the multiplexer through the asynchronous serial communication port; reconstructing at least one data set from the received data packet; determining a selected one of the plurality of applications to which said data set is addressed; and routing the data set to the selected one of the plurality of applications.

In a further aspect of the present invention, the object oriented computing environment also includes a user interface object for providing user input of communication settings for the plurality of output ports. The user interface object executes in the object oriented computing environment to thereby perform operations including; displaying a user input display on a monitor; receiving user specified communication settings associated with at least one of the plurality of output ports; and providing the user specified communication settings to the multiplexer control object.

In one embodiment of the present invention, the multiplexer device receives data from at least one of the plurality of output ports and determines if a selected amount of data has been received from the plurality of output ports. A packet of data is generated for routing to the multiplexer server object through the asynchronous serial communication port if a selected amount of data has been received from the plurality of output ports. The packet of data is routed to the multiplexer server object through the asynchronous serial communication port. A bitmap field may be generated by the multiplexer identifying associated fields of the packet of data routed to the multiplexer server object which contain data from an associated one of the plurality of output ports and associated fields which contain null data. The bitmap field may be routed with the packet of data routed to the multiplexer server object.

In a further embodiment of the present invention a method of increasing the utilization of an asynchronous serial communication port on a first computer is provided. A first communication directed to the asynchronous serial communication port from a first application executing on a computer is intercepted. A second communication directed to the asynchronous serial communication port from a second application executing on a computer is also intercepted. The first and second communication are packetized to provide a multiplexed data packet. The multiplexed data packet is sent to a multiplexer including a plurality of output ports over the asynchronous serial communication ports. The multiplexed data packet is received at the multiplexer and the first and second communication are separated out. The first communication is routed to a first one of the plurality of output ports for transmission at a first baud rate and the second communication is routed to a second one of the plurality of output ports for transmission at a second baud rate.

In an apparatus related aspect of the present invention an independently configurable serial communication multiplexer circuit is provided. The circuit includes an asynchronous serial communication port and a controller coupled to the asynchronous serial communication port. The controller is coupled to a data bus. A plurality of latches are provided each having an input coupled to the data bus and an output. A first multiplexer is coupled to at least one of the latches and includes inputs and an output which is coupled to a selected one of the first multiplexer inputs responsive to an output of at least one of the plurality of latches. Also provided in the circuit is a second multiplexer having inputs and an output which is coupled to a selected one of the second multiplexer inputs responsive to an output of at least one of the plurality of latches. A clock generator having a plurality of baud rate outputs is coupled to inputs of the first multiplexer and the second multiplexer. A first asynchronous communication adapter having a plurality of data inputs coupled to the data bus and a transmit clock input coupled to the output of the first multiplexer supports a first output port. A second asynchronous communication adapter having a plurality of data inputs coupled to the data bus and a transmit clock input coupled to the output of the second multiplexer provides a second output port. The controller sets outputs of the plurality of latches over the data bus to select one of the plurality of baud rate outputs as the transmit clock input of the first asynchronous communication adapter and one of the plurality of baud rate outputs as the transmit clock input to the second asynchronous communication adapter.

As will be appreciated by those of skill in this art, the above described aspects of the present invention, while primarily described in terms of methods, may also be provided as apparatus or computer program products.

The present invention provides systems, methods and computer program products which enable a serial port on a computer to be utilized efficiently by overcoming limitations on the throughput of the serial port caused by downstream rate limited devices such as modems. The port may operate at high baud rates carrying multiplexed data to operate a plurality of downstream communications channels which would otherwise be unable to support the capabilities of the serial port.

BRIEF DESCRIPTION OF THE DRAWINGS

FIG. 9 is a block diagram illustrating an exemplary data packet for transmission upstream from a multiplexer to a computer according to an embodiment of the present invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
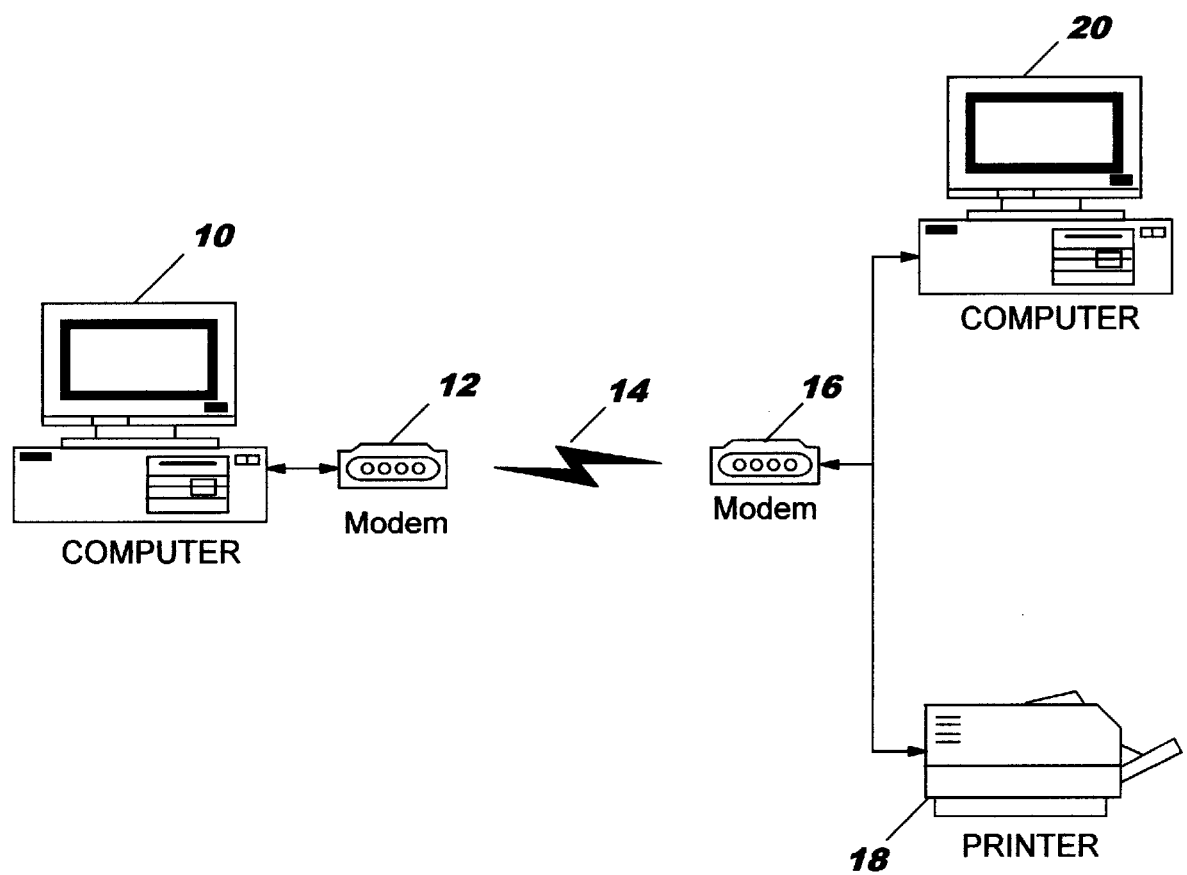
FIG. 1 is a block diagram of a typical serial communication connection operating over a public switch telephone network utilizing modems.
Figure 2:
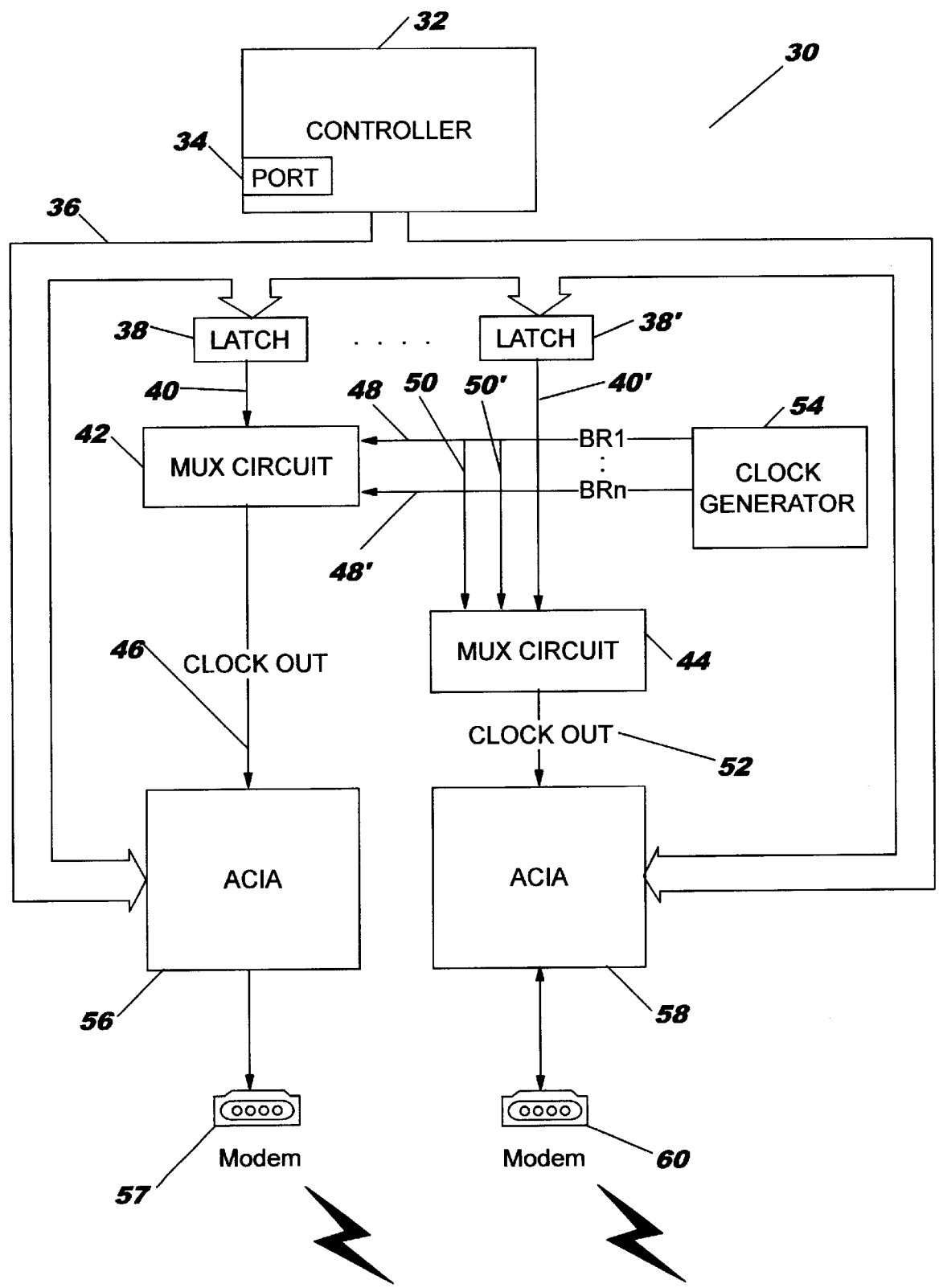
FIG. 2 is a block diagram of an independently configurable serial communication multiplexer apparatus according to one embodiment of the present invention.

Referring now to FIG. 2, an embodiment of a multiplexer circuit according to the present invention will now be described. Multiplexer device 30 provides an independently configurable serial communication multiplexer circuit providing for increased utilization of a serial port of a computer device. Multiplexer device 30 includes controller 32 which is connected to the asynchronous serial communication port of a computer (not shown) through an asynchronous serial communication port 34. While port 34 is illustrated as being contained within controller 32 in FIG. 2, it is to be understood that a separate serial interface circuit coupled to controller 32 may also be used according to the teachings of the present invention. Controller 32 is also coupled to data bus 36. Controller 32 may be a variety of devices such as a Motorola 68HC11 in which case data bus 36 is an 8-bit data bus.

A plurality of latches 38 are also provided, each having an input coupled to data bus 36. In the embodiment illustrated in FIG. 2, only two latches are shown for purposes of ease of illustration. As illustrated in FIG. 2, each latch 38, 38' is shown with a single output 40, 40' coupled to multiplexer circuits 42, 44 respectively. The number of latch outputs required is a function of the number of different baud rates which are to be provided by independently configurable serial communication multiplexer device 30 where the maximum number of baud rates capable of being selected is equal to 2 raised to the power of the number of latch outputs ($2^n$). For example, if only a single latch output is provided to multiplexer circuit 42, 44 only two states are provided, thereby allowing selection of any one of two different baud rates. It is to be understood that two latch outputs 40, 40' into each multiplexer 42, 44 would provide for four possible baud rates, 3 would provide 8 and so on. In such case, latches 38, 38' may each comprise a plurality of individual latches either as discrete devices or as multibit latch devices. It is also to be understood that the number of bits of data bus 36 which must be connected to latches 38, 38' depends on the number of different output combinations which are desired from latches 38, 38' (i. e., one input from data bus 36 provides for two possible output states from latch 38, two for four and so on).

First multiplexer 42 includes an output 46 and a plurality of inputs 48, 48'. Output 40 of latch 38 provides the select input to first multiplexer 42 and selects one of the first multiplexer inputs 48, 48' to be coupled to output 46. Similarly, second multiplexer 44 has inputs 50, 50' and an output 52. A selected one of inputs 50, 50' is connected to output 52 responsive to the select state input from output 40' of latch 38'. As shown in FIG. 2, while only two baud rate input lines are illustrated as inputs to each multiplexer circuit, up to n baud rate options may be provided so long as multiplexer circuits 42, 44 have a corresponding number of available inputs. For example, if eight different baud rates are to be made available, then multiplexer circuits 42, 44, should be provided as 8-1 multiplexers with 3 select input bits. The various baud rate clocking signals are provided to multiplexer circuits 42, 44 by clock generator 54 which generates n baud rate clocks; one for each available baud rate.

A first asychronous communication interface adaptor (ACIA) 56 is provided which has a plurality of data inputs coupled to data bus 36. ACIA 56 further includes a transmit clock input which is coupled to the clock output 46 from multiplexer 42. In the illustrated embodiment, both the transmit and receive clock of ACIA 56 are connected to a single clock output 46 from multiplexer 42 providing a common baud rate for receive and transmit operations by ACIA 56. Data to be transmitted by (or received from) ACIA 56 is provided over bus 36 from controller 32. ACIA 56, as illustrated in FIG. 2, may be turn connected to modem 57 for communications to and from remote devices.

ACIA 58 operates essentially identically to ACIA 56 but independently therefrom. Transmit and receive clock inputs to ACIA 58 are provided by clock output 52 of multiplexer 44. Data to be transmitted (or received from) ACIA 58 is provided over bus 36 by controller 32 as was described with respect to ACIA 56. ACIA 58 in turn communicates with remote devices over modem 60.

Independently configurable serial communication multiplexer device 30 allows separate baud rates to be used for modems 57 and 60 as controller 32 sets the outputs of latches 38, 38' over data bus 36 to select one of a plurality of baud rate outputs of clock generator 54 as the transmit clock input of first ACIA 56 and one of the plurality of baud rate outputs of clock generator 54 as the transmit clock input to ACIA 58. While only independent baud rate selection has been discussed in connection with FIG. 2, it is to be understood that one of ordinary skill in the art could further appreciate that the circuit of FIG. 2 also provides for independent control of other communication settings of ACIA 56, 58 such as parity by controller 32 over bus 36. IN such a case, appropriate latches would be provided for each ACIA of the mulitplexer 30. The latches could then be loaded by controller 32 with the control information for the corresponding ACIA.

Figure 3B:
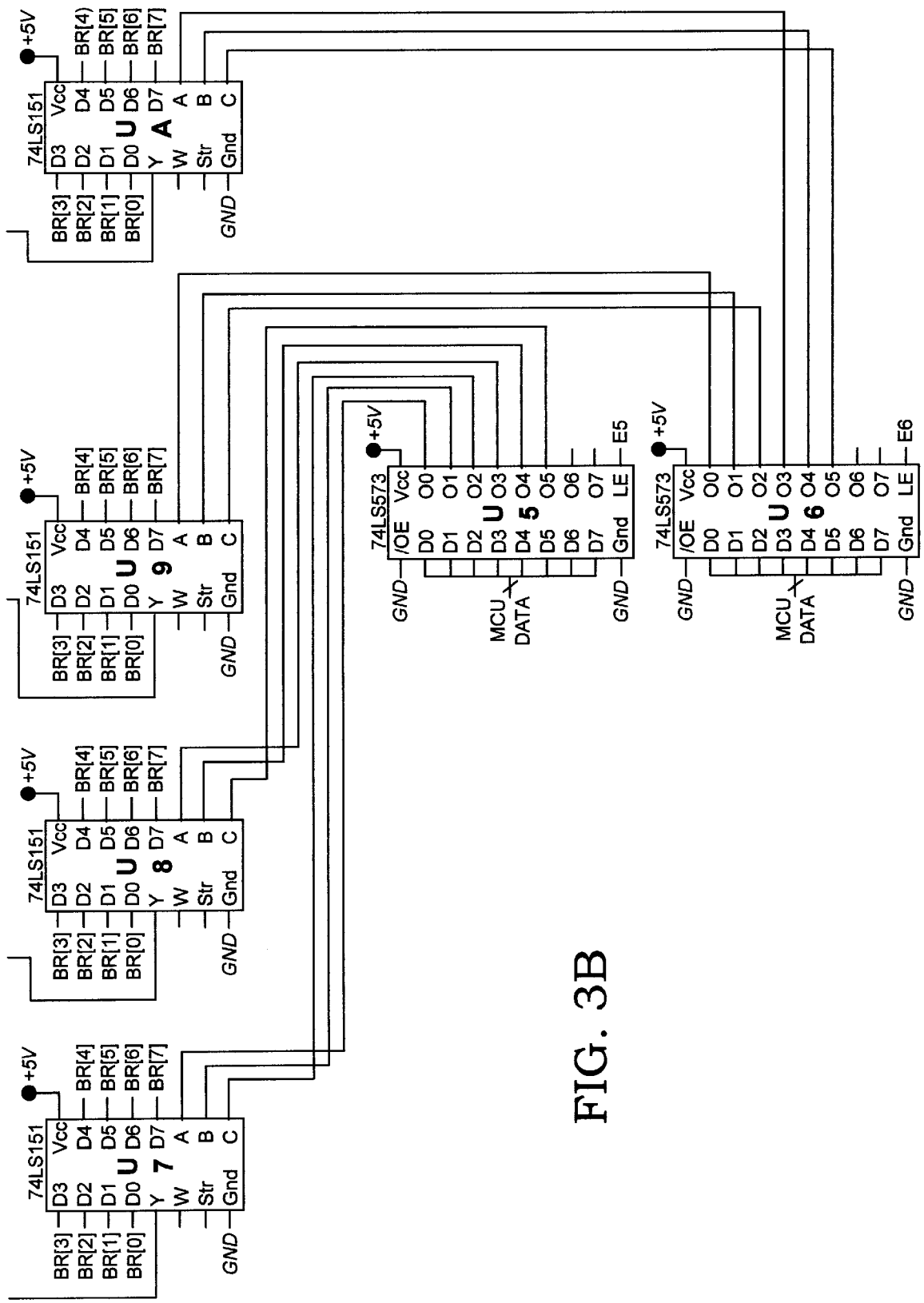
FIG. 3 is a detailed circuit diagram illustrating an embodiment of the device of FIG. 2.

A circuit diagram for an independently configurable one port to four port serial communication multiplexer device is illustrated in FIG. 3. As shown in FIG. 3, latches 38, 38' are provided as chips U5, U6 which, in the illustrated embodiment are 74LS573 octal latches. Multiplexers 42, 44 are provided as shown at chips U7, U8, U9 and UA which are 74LS151 chips. These chips are 8 to 1 multiplexer chips providing for eight possible baud rates for the output ports. Clock generator 54 is shown at chip UB as a 14411 clock generator which is capable of providing 16 baud rates from a single crystal. ACIAs 56, 58 are shown in FIG. 3 as chips U1 through U4 which are Motorola 68B50 asynchronous communication interface adaptors. In addition, chip U0 is shown which provides the serial communication interface between controller 32 and the asynchronous communication line from the computer output port (i.e., provides port 34 for controller 32). While controller 32 is not illustrated in FIG. 3, each of chips U0 through U6 is illustrated as connected to data bus 36 by the notation MCU data. As shown in FIG. 3, data bus 36 is an 8 bit data bus compatible with an MC68HC11 controller which functions as controller 32.

Octal latches U5 and U6 control two of the independently configurable ACIA devices. For example, with respect to octal latch U6, output bits 00, 01 and 02 are provided to the select ports A, B and C of multiplexer chip U9. Output ports 03, 04 and 05 and 06 are provided to input ports A, B and C of multiplexer UA. Accordingly, to change the baud rate for an output port, controller 32 places the appropriate desired latch states on the MCU data bus and then activates the latch enable pin of U6 using, for example, an address output bit or other controllable digital output from controller 32 which is coupled to the latch enable pin of U6. The latch outputs are in turn set to the desired value which provides the select input to multiplexer UA. The designated input baud rate is then coupled by multiplexer UA to output port Y which is in turn coupled to the transmit and receive clock inputs of ACIA chip U2.

Data bus 36 is provided to ACIA chips U1 through U4 to exchange data routed through the respective chips and provide control inputs (such as parity settings). As illustrated in the embodiment of FIG. 3, various other control lines to ACIA U2 (and to the remaining ACIAs) are coupled to various control pins from controller 32. A controller address bus bit (MCU ADR3) is connected to the register select input pin of the ACIA to select read or status mode. Status mode is utilized to write control information to the ACIA and read status information from the ACIA. The controller read/write line (designated MCUR/W) is used to drive the read/write select input to the ACIA. Enable pin E is connected to the EN2 output from the controller to enable the device when data has been placed by controller 32 on the bus 36 for transmission by the selected (enabled) ACIA U2. Accordingly, as illustrated in FIG. 3, each of the register select lines of ACIAs U0 through U4 share a common connection to MCU address 3 but have a unique enable input.

The Motorola 68B50 ACIAs in the embodiment of FIG. 3 are modified by employing a clock-stretch of 1 cycle to slow down access to the ACIA from the 68HC11 controller (running with a 4 MHz bus speed). This is because the ACIA uses an enable pulse width of at least 220 ns.

The embodiment illustrated in FIG. 3 also utilizes memory-mapped I/O that uses the bus signal expCS1 configured as an active-low enable signal to become active when memory locations between $1060 and $17FF are accessed (as used herein number values preceded by "$" shall indicate hexadecimal values). A 74HC138 decoder chip (not shown) is used to map the ACIAs and baud rate latches to locations. Each ACIA has two registers, therefore, each ACIA shows up at two memory locations. As described above, the ADR3 signal from the MCU bus is tied to the RS (Register Select) signal of the ACIAs to select the ACIAs at the two locations. The decoder chip gets its input from the chip select signal (which is asserted when memory from $1060–$17FF is accessed) and ADR0 through ADR2. This arrangement gives the decoder's eight outputs' mapping as follows (the first three digits of the addresses are in hexadecimal, and the last nibble is the four bit binary representation of the address):

| Decoder Output | Memory Location |
| --- | --- |
| Y0 | $106[x000] |
| Y1 | $106[x001] |
| Y2 | $106[x010] |
| Y3 | $106[x011] |
| Y4 | $106[x100] |
| Y5 | $106[x101] |
| Y6 | $106[x110] |
| Y7 | $106[x111] |

The two different registers of the ACIA differentiate the status and control functionality from the transmit and receive data functionality. The read/write signal (R/W* from the MCU bus) is connected straight to the R/W* signal of the ACIAs, as they follow the correct convention with respect to this line.

The Motorola 14411 clock generator chip UB is provided a 1.8432 MHz crystal and outputs 16 different common baud rates. A baud rate, in this sense, is a 50% duty-cycle square wave at a frequency 16 times the desired bit rate. The frequency is provided at 16 times as great as the actual bit stream's bit rate to operate the ACIAs in divide by 16 mode to oversample the input stream to synchronize themselves with the originator of the signal. The 14411 chip operates in its own divide by 64 mode (by tying its two mode select pins to high) to achieve the baud rate clocks that correspond to the correct frequencies for divide by 16 operation of the ACIAs.

Eight of the most common baud rates are selected for potential use in the embodiment of FIG. 3 and fed as the inputs to the four 74LS151 8-to-1 multiplexers U7, U8, U9, UA. Each output of a multiplexer is tied to the Rx clock and Tx clock line of a separate ACIA. The select lines of the multiplexers are driven by the outputs of 74LS573 D-type latches U5, U6. The Latch Enable signals of the latches are tied to outputs of the decoder so that each of the latches show up at a separate memory location.

As described above, this allows writing to the latches to individually configure the baud rates of the ACIAs. Taking into account the configuration of the decoder and the use of the ADR3 line to select Status and Control versus Data manipulation in the ACIA, the resulting memory map for each of the memory-mapped devices on the embodiment of FIG. 3 is as follows:

| Memory-Mapped Device | Memory Location |
| --- | --- |
| ACIA 0 Status/Control | $1060 |
| ACIA 1 Status/Control | $1061 |
| ACIA 2 Status/Control | $1062 |
| ACIA 3 Status/Control | $1063 |
| ACIA 4 Status/Control | $1064 |
| Baud Rate 1, 2 Latch | $1065 |
| Baud Rate 3, 4 Latch | $1066 |
| ACIA 0 Transmit/Receive Data | $1067 |
| ACIA 1 Transmit/Receive Data | $1068 |
| ACIA 2 Transmit/Receive Data | $1069 |
| ACIA 3 Transmit/Receive Data | $106A |
| ACIA 4 Transmit/Receive Data | $106B |

The difference between Status and Control in an ACIA is determined simply by reading versus writing to the given memory location. For instance, to get status from ACIA 0, a byte is read from location $1060. To set control of ACIA 0, a byte is written to location $1060. This is a result of the ACIAs' usage of the R/W input. Note that the latches do nothing with the R/W* signal, so if they are read the data will be meaningless and the action will cause them to latch whatever value is on the bus during the MCU's read cycle (a floating value). The outputs of the decoder signals are active low, and the enable inputs of the ACIAs and the latches are all active high, so the decoder outputs are all run through an inverting buffer to convert the signals to the correct logic convention.

Figure 4:
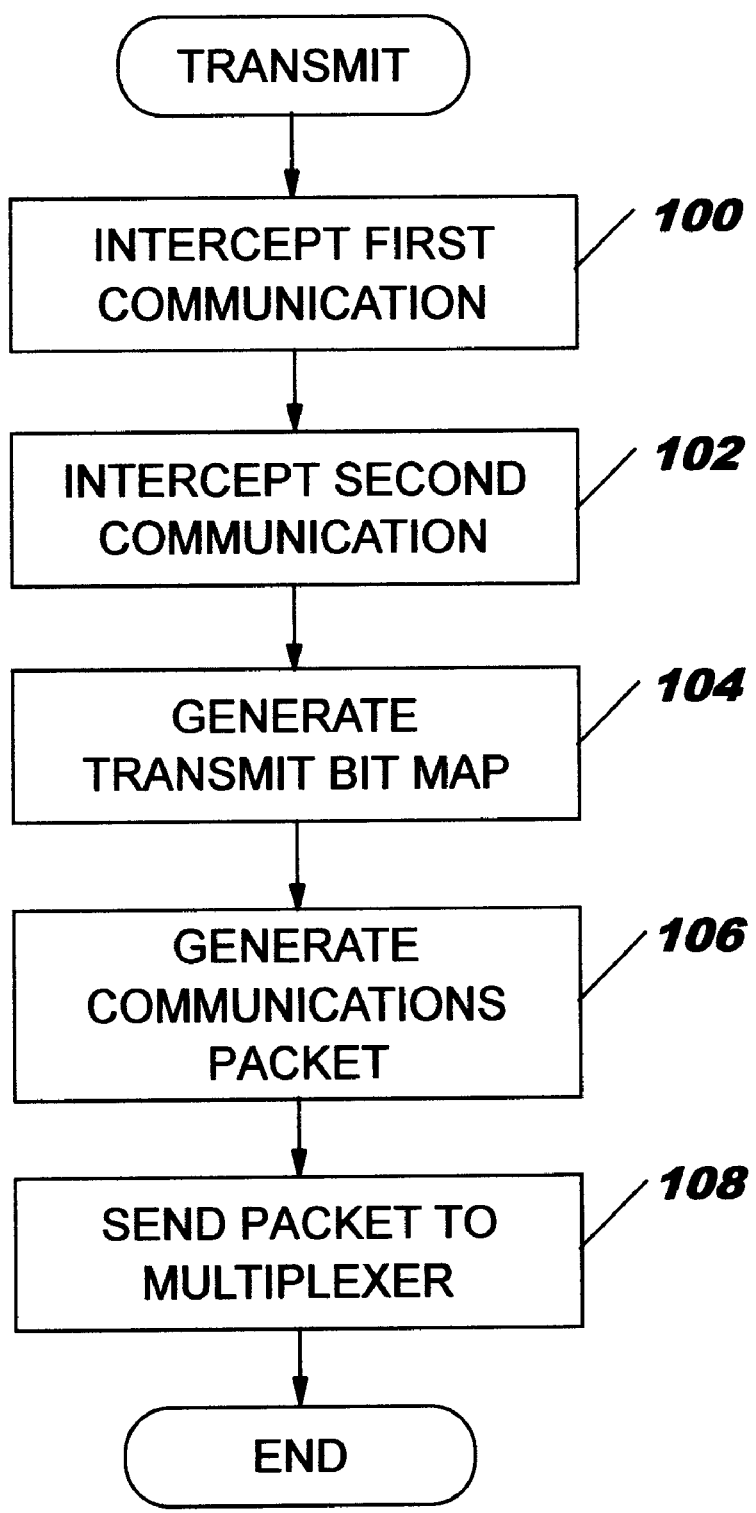
FIG. 4 is a flow diagram depicting operations executed by the multiplexed computer for routing communication data from the computer to a multiplexer according to one embodiment of the present invention.

Referring now to FIG. 4, operations according to an embodiment of the present invention will now be described. Specifically, with respect to FIG. 4, operations for transmittal of a data communication packet from the computer to multiplexer 30 for transmission on one of a plurality of output ports will be described with respect to operations executed by code resident on the computer having the serial output port which is multiplexed. Operations as will be described with reference to FIG. 4 and the following flowchart illustrations provide for a method of increasing the utilization of an asynchronous serial communication port on a computer.

At block 100 a first communication directed to the asynchronous serial communication port from a first application executing on a computer and associated with a first named pipe is intercepted. It is to be understood that the application may be resident and executing on the same computer on which the asynchronous communication port resides. However, the application may also be executing on a separate computer which is networked to the computer on which the asynchronous communication port resides.

At block 102 a second communication directed to the asynchronous serial communication port from a second application executing on a computer is intercepted. As will be described further later herein with respect to an object oriented embodiment of the code for performing operations according to the present invention, the first application and the second application will each be configured to direct the communication to a designated named pipe rather than a particular output port. The methods and apparatus of the present invention intercept and route these named pipe directed communications to the hardware port. In addition, while only a first and second communication pipe are recited with respect to the flowchart, it is to be understood that additional applications may be executing and communicating over additional named pipes. For example, the illustrated embodiment of FIG. 3 was configured to support four independently configurable communication pipes from a single output port.

As will be described more fully herein, when data communication is intercepted from either application at block 100 or block 102, a data queue is checked for each pipe to determine if sufficient data has been received to generate a packet for transmission. Accordingly, for any given packet being transmitted to multiplexer 30 any given named pipe may have no data to be placed in the packet for transmission to the multiplexer. Accordingly, at block 104 a bit map is generated identifying which named pipes have data for transmission and which named pipes have only null data because no data is queued for transmission.

At block 106, the first and second communications are packetixed to provide a multiplexed data packet. The multiplexed data packet for the illustrated embodiment includes a defined first field associated with the first application (named pipe) and a second field in the multiplexed data packet associated with the second application (named pipe). Data intercepted from the first application is placed in the first field. It is then determined if any data has been intercepted from the second application at block 102 but not yet sent to the multiplexer. If so, any data which has been intercepted from the second application, but not yet sent to the multiplexer 30, is placed in the second field. The bit map information from block 104 is placed into a separate field for transmittal with data to be communicated is packeted at block 106. Finally, at block 108, the generated packet is sent to the multiplexer over the asynchronous serial communication port of the computer.

Figure 5:
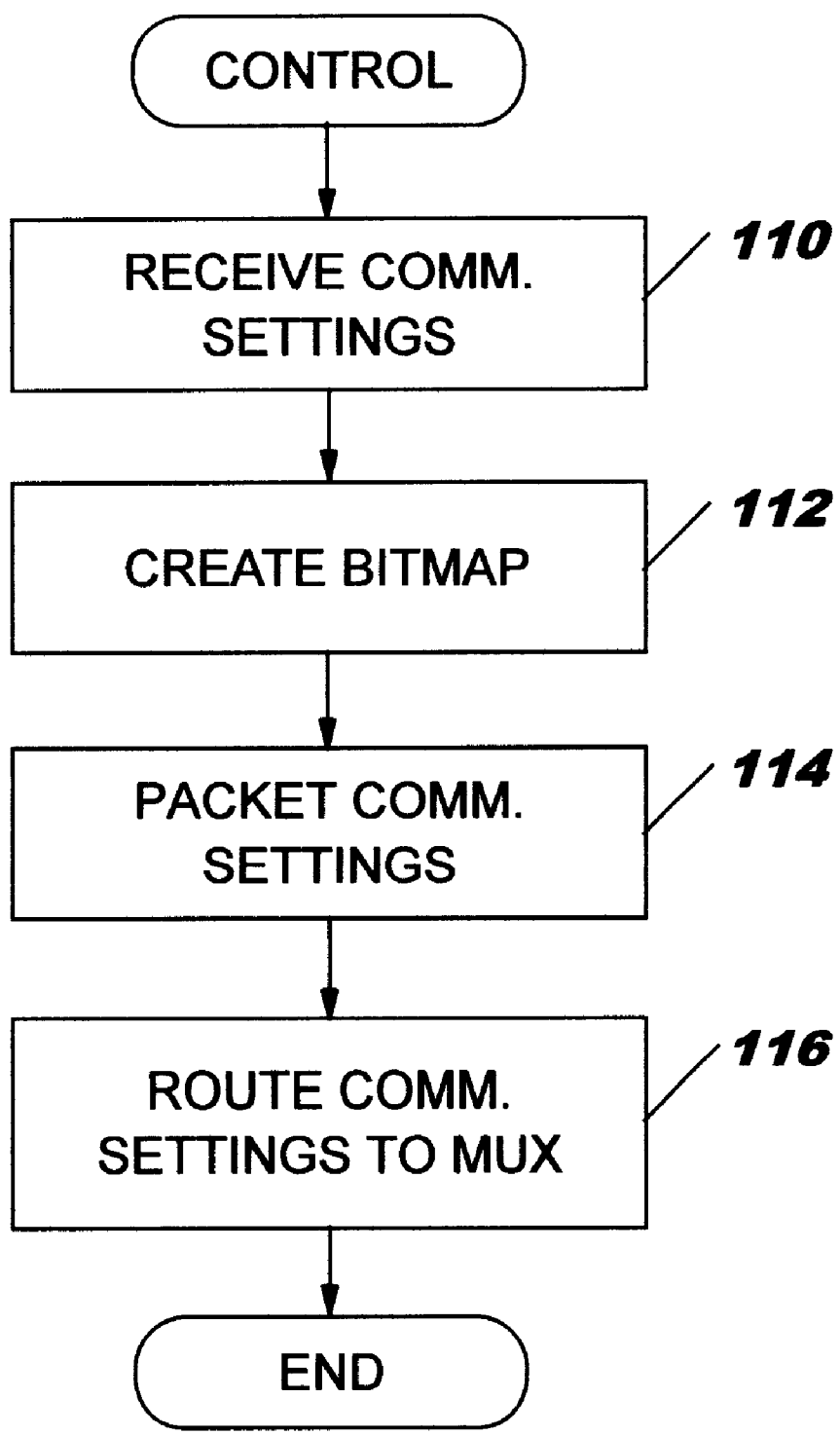
FIG. 5 is a flow diagram depicting operations executed by the multiplexed computer for providing updated communications settings to a multiplexer according to an embodiment of the present invention.

Referring now to FIG. 5, operations for receiving communications settings and providing those settings to multiplexer 30 will be described. At block 110, communication settings for at least one of a plurality of output ports of multiplexer 30 are received. At block 112, a bit map is generated identifying the output ports for which communication settings have been received at block 110. Alternatively, settings may be updated for all output ports whenever communication setting information is received. At block 114, the received communication settings are packetized for transmission to multiplexer 30. The packet generated at block 114 includes a field associated with each of the plurality of output ports and the bit map generated at block 112 is provided as a single field identifying associated fields of the received communication settings packet which contain communication settings. The packetized communication settings are routed to multiplexer 30 through the asynchronous serial communication port at block 116.

Figure 6:
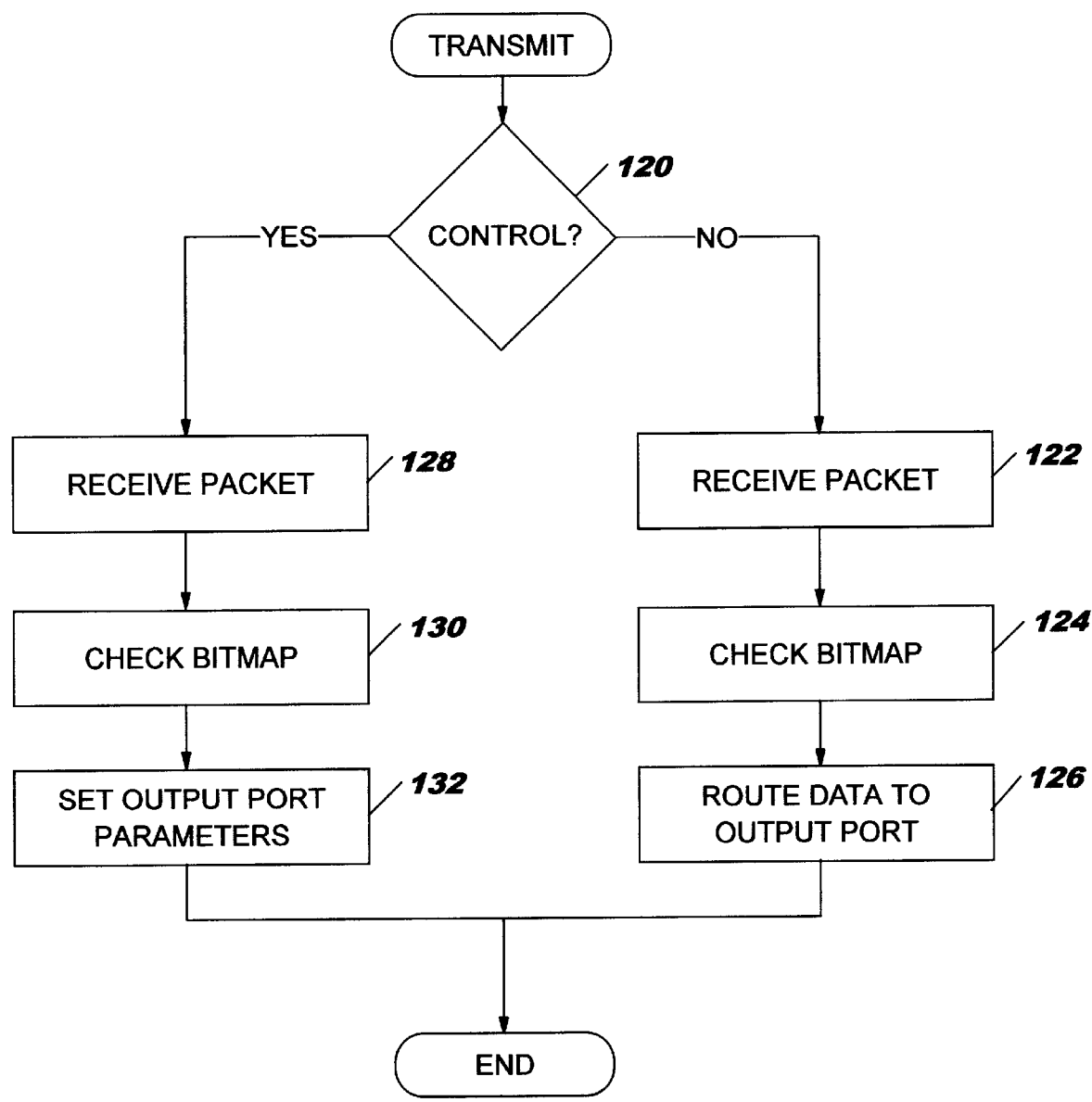
FIG. 6 is a flow diagram depicting operations carried out by a multiplexer in routing data and control information received from the computer to output ports of the multiplexer.

Referring now to FIG. 6, operations performed by multiplexer 30 during transmission of a data communication from the originating computer to one of a plurality of output ports will now be described. At block 120, multiplexer 30 checks an incoming packet to determine whether it contains communications data or control settings. If the packet contains communications data, the packet is received for processing and transmission by an output port at block 122. At block 124, the bit map field is checked to determine which of the output port associated fields contain data to communicate and which contain null data. The bit map field is preferably routed to the multiplexer 30 before the subsequent data fields to reduce the processing required at multiplexer 30 as incoming null data can be determined to be null data rather than data for communication on receipt of the bit map field. At block 126, any received data is routed to the associated destination output port for transmission by ACIA 56, 58. A first communication from a first application may thereby be provided to a first output port for communication at a first baud rate and a second communication may be provided to a second output port for communication at a second baud rate. The second baud rate may be different from the first baud rate. Alternatively, both the first and second communication could be routed to one output port (for example a shared printer device could receive communications from two applications through two named pipes).

If the received packet is determined to contain control setting information at block 120, the packet is received at block 128 for processing by controller 32 to update communication settings of ACIA's 56, 58. At block 130, the bit map for the received control settings packet is checked to determine which fields contain updated control settings and which contain null data. At block 132, the output port parameters are adjusted to the received communications settings for any output ports whose associated fields contain new control settings. Alternatively, all settings may be updated each time a control packet is received.

Figure 7:
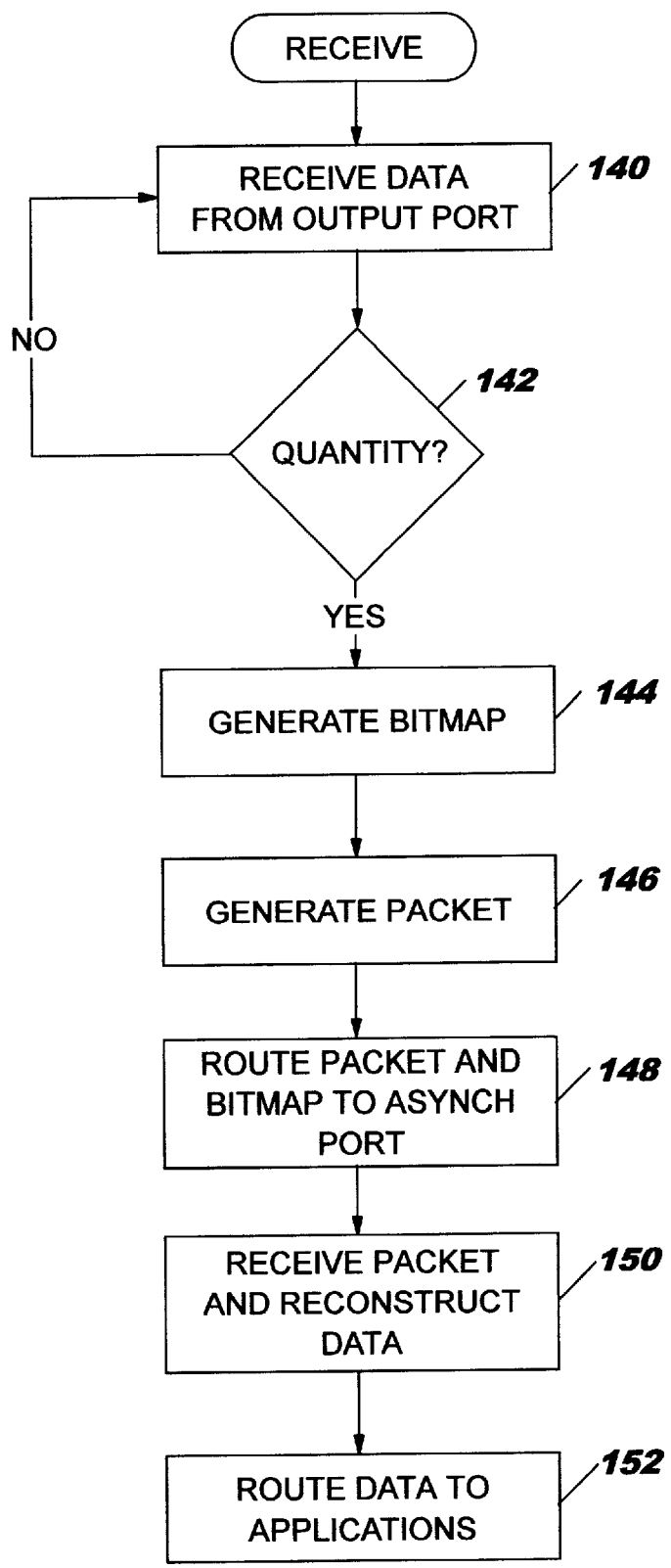
FIG. 7 is a flow diagram depicting operations for receiving data from an output port of a multiplexer and routing that upstream data flow to an application executing on a computer in communication with a named pipe according to one embodiment of the present invention.

Referring now to the flowchart of FIG. 7, operations according to an embodiment of the present invention for routing data received by an output port of multiplexer 30, such as modem 57 or modem 60 to be routed to a computer having an asynchronous serial communication port will now be described. At block 140, data is received by multiplexer 30 from at least one of the plurality of output ports. At block 142, controller 32 determines if a selected amount of data has been received from the plurality of output ports. The selected amount of data to be received and buffered before transmission to the destination computer may be set at a variety of levels. The fastest response is provided by setting this value to a minimum level. However, the lower the value, the more likely it is that in any given transmission of a packet between the computer and multiplexer 30 a large number of the transmitted fields will contain null data.

At block 144, a bit map field is generated to identify associated fields of the packet which will be transmitted to the computer which contain data from an associated one of a plurality of output ports and associated fields which contain null data. At block 146, the packet for transmission from multiplexer 30 to the destination computer is generated. The received packet of data is routed to the asynchronous communication port 34 along with the bit map field for the received data packet at block 148.

At block 150, the data packet is received at the destination computer from multiplexer 30 through the computer's asynchronous serial communication port. Also at block 150, data from the received data packet is reconstructed to provide at least one data set selected from a field of the received packet for routing to an associated named pipe on the destination computer. At block 152, the data set from an associated field is routed to the selected user application associated with the named pipe for that field.

FIGS. 4 to 7 are flowchart illustrations of methods and systems according to the invention. It will be understood that each block of the flowchart illustrations, and combinations of blocks in the flowchart illustrations, can be be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, may be implemented by special purpose hardware-based computer systems which perform the specified functions or steps, or combinations of special purpose hardware and computer instructions.

Implementation Details for the Embodiment of FIG. 3

Detailed parameters for the embodiment of the system of the present invention illustrated in FIG. 3 and its associated operations will now be described. It is to be understood that these details are merely to aid in the understanding of one of ordinary skill of how to practice the present invention.

As described previously, multiplexer device 30 in FIG. 3 has five communications ports, each driven by a Motorola 68B50 ACIA (Asynchronous Communications Interface Adapter). The upstream connection to the computer may be hard-wired to communicate at 115.2 kbps, but each of the four peripheral connections can communicate at any bit rate listed in Table 1 below.

1. 1200
2. 2400
3. 4800
4. 9600
5. 14.4 k
6. 19.2 k
7. 28.8 k
8. 38.4 k

TABLE 1

Selectable Baud Rate Options

Furthermore, while the upstream ACIA is hard-coded to communicate with line characteristics of 8 data bits, 1 stop bit and no parity, the peripheral ACIAs can be configured to communicate with the line characteristics described in Table 2 below:

7 Bits+Even Parity+Stop Bits
7 Bits+Odd Parity+Stop Bits
7 Bits+Even Parity+1 Stop Bit
7 Bits+Odd Parity+1 Stop Bit
8 Bits+2 Stop Bits
8 Bits+1 Stop Bit 8 Bits+Even Parity+1 Stop Bit
8 Bits+Odd Parity+1 Stop Bit TABLE 2
Selectable Line Characteristics Options The software executing the operations of the present invention on a computer 10 will now be described. The object oriented code consists of three pieces of code. The first is the multiplexer server object. This program, which preferably is run on Windows NT 4.0, manages the sole connection to multiplexer 30 through the COM1 or other serial aport of computer 10. It also creates and manages four named pipes that user application programs can access from the computer to which the multiplexer 30 is connected. If the computer connected to multiplexer 30 is configured as a Windows NT Server, then a program running on a network-connected workstation may also access the named pipes via the network.

The pipes are named as follows: \pipe\MUX0, \pipe\MUX1, \pipe\MUX2, and \pipe\MUX3. They correspond to the four ACIA connections (output ports) on the multiplexer 30 where \pipe\MUX0 has a full-duplex connection with ACIA 0, \pipe\MUX1 has a full-duplex connection with ACIA 1 and so on.

The second piece of code is the client object, a Named Pipe ASCII terminal emulator. This program is similar to a standard terminal program (like HyperTerminal in Windows 95 and NT, or TERMINAL from Windows 3.1) except that it is optimized to communicate over named pipes. The pipe names are partially hard-coded (the user only has to specify which ACIA number they wish to communicate with and the program fills in the rest of the pipe name). Network communications are also provided for by this client application. It starts by querying the user for the LAN machine name where the multiplexer server object is located. The client object automatically finds the pipes.

The third piece of code that is included in the package is the user interface object. This code is a user interface that allows for the setting of the individual communications characteristics (settings) of the ACIA connections. The user sets the desired line parameters and instructs the object to send the information to the multiplexer 30, for example by pressing a designated key or button graphic on the screen. All four ACIAs may be reset any time the user presses this button.

Multiplexer Server Object Description

Figure 8:
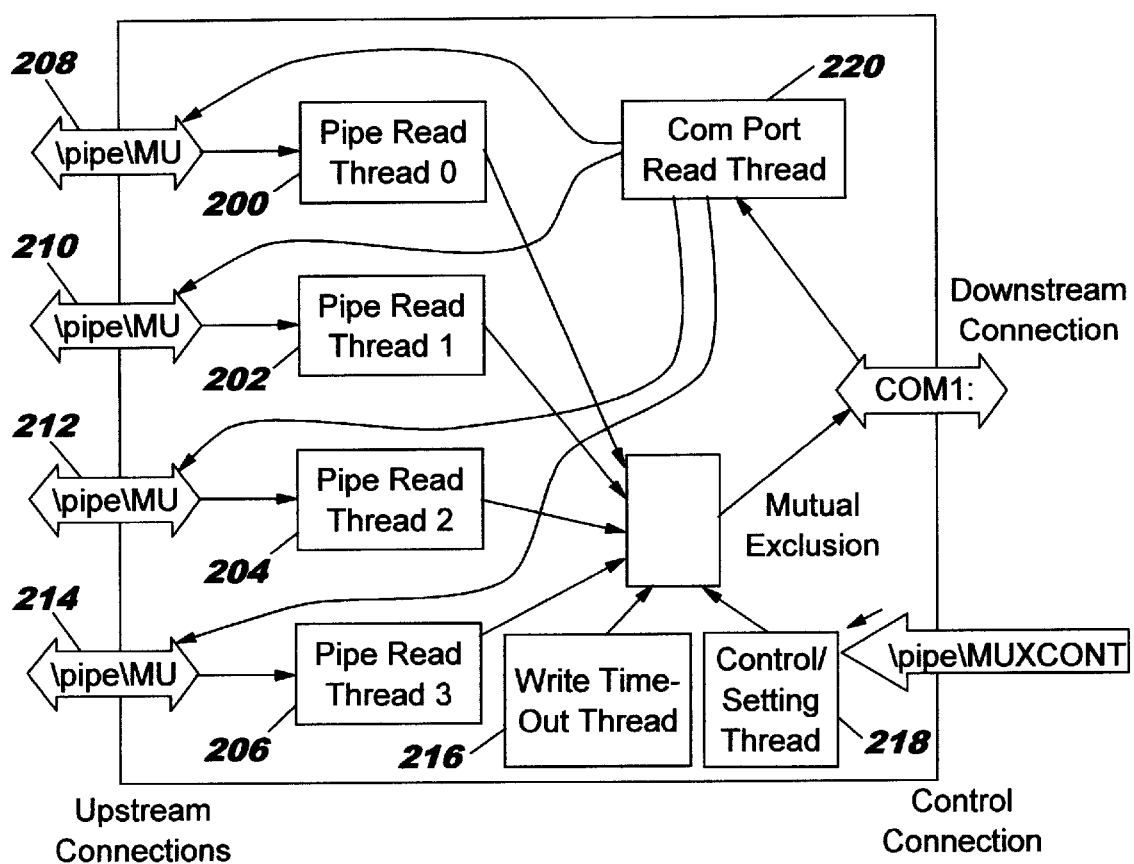
FIG. 8 is a block diagram illustrating various threads of code in an object oriented computing environment for a multiplexer server object according to an embodiment of the present invention.

As illustrated in FIG. 8 the multiplexer server object consists of seven threads of code for a 4 to 1 application. Four pipe threads 200, 202, 204, 206 create the named pipes 208, 210, 212, 214 to which user application programs can connect. The fifth thread is a timeout thread 216 which implements an asynchronous free-running software timer that allows packets that are not completely full to be sent down to the multiplexer 30 when a timeout value has elapsed. This prevents data from being cached forever waiting for a full packet to be formed. The sixth thread is a multiplexer control object thread 218 that processes communication settings from the user interface object. The final thread is the read object thread 220 for data received via the output ports.

The named pipes are read from and written to the different threads of execution. This capability is provided by Windows NT overlapped I/O. The overlapped extensions of the file APIs and the special overlapped API (GetOverlappedResult ()) provide for the asynchronous access to Windows NT file handles.

The read thread runs at a slightly higher priority and accesses the COM port connection. This is to reduce the likelihood that data coming up from the multiplexer 30 will be lost due to not servicing the COM interrupts fast enough. This priority adjustment may also decrease the CPU power necessary for the minimum required configuration.

The packets that come up from the MUX are of the following form:

['K'][0][1][2][3][0][1][2][3][BM]

The 'K' is a header byte that the multiplexer server uses to synchronize itself with multiplexer 30. The next byte is either one byte of data from ACIA 0 that should be routed to the named pipe that is associated with ACIA 0 (\pipe\MUX0) or it is a place-holder byte (null data). Likewise, the next byte is the same thing, only from ACIA 1. The next six bytes are similarly specified, starting over at byte 6 (the second byte labeled 0 in the diagram). The last byte of the packet is a bitmap field that tells which bytes of the packet are valid data and which are null data The least significant bit of the bitmap corresponds to the first byte in the packet and the neighboring bits proceed to describe the neighboring bytes all the way through to the most significant bit which corresponds to the ninth byte (the second ACIA 3 byte) of the packet. As can be seen, each packet holds at most two bytes from each ACIA.

FIG. 9 shows an example packet from the multiplexer 30 and how the multiplexer server routes the data to the appropriate pipe. As illustrated in FIG. 9, the bitmap is bit-reversed.

The downstream packet (data sent from the computer to the multiplexer) is very similar to the upstream one. However, the bitmap field is placed before the data following the header in the following form:

['K'][BM][0][1][2][3][0][1][2][3]

Providing the bitmap first recognizes the relative processing power disparity that typically exists between the host computer and controller 32. The computer will typically be quite capable of buffering up a whole packet before sending it, then building the bitmap at once before it sends the data. This allows the multiplexer 30 to receive the bitmap before it gets data so there is a reduction in the complexity of the code on controller 30 involved in managing the packets. Conversely, the computer is capable of waiting to receive a whole packet before routing its contents (which follows from receiving the bitmap after the data). This, in turn, enables the multiplexer 30 to send the data and simply build the bitmap (using the 68HC11's bit manipulation op-codes) as it goes, then push the bitmap byte onto the upstream ACIA at the end.

The timeout thread is a simple loop that Sleep()'s for 750 ms then sends a message to flush data if it exists. This ensures that a singleton byte (a solo byte that does not fill up an entire packet, thus triggering the server to send it) will typically only have to wait on average 375 ms before being sent. The timeout value may be changed if desired.

Critical sections are also provided in the multiplexer server code. A critical section is a programming construct that allows data to be accessed in a mutually exclusive fashion. This is useful when designing software that utilizes multiple threads of execution that sometimes need to access global data or other resources, because by definition threads can preempt each other and cause race conditions and other problems. This can occur with the multiplexer server threads. The four pipe threads are dedicated to receiving data from each of the four pipes. Every time a piece of data is received in a given pipe thread, it is placed in a special two-byte queue (or a different size may be used to trigger packeting) that is dedicated to that particular pipe. Each time a datum is received, all pipes are tested to see if any of them have two bytes. When any queue has two bytes, a packet is formed and sent to the multiplexer 30. Conflicts can arise because all pipes are tested (i.e. the population of each pipe is queried) in the context of a particular pipe. For instance, the following is an exemplary order of operations when a datum arrives on pipe 1:

1) Pipe 1 gets a byte; thread 1 is awakened.
2) Thread 1 reads the byte and stores it in Queue 1. Queue 1 Population is incremented.
3) Queue 0 Population is read to see if it is 2. If so, a packet is sent.
4) Queue 1 Population is read to see if it is 2. If so, a packet is sent.
5) Queue 2 Population is read to see if it is 2. If so, a packet is sent.
6) Queue 3 Population is read to see if it is 2. If so, a packet is sent.

All of these actions are taking place in the context of the pipe thread that received the data, in this case thread 1. A conflict occurs in the following situation:

1) Pipe 1 gets a byte; Thread 1 is awakened.
2) Thread 1 reads the byte and stores it in Queue 1. Queue 1 Population is incremented.
3) Queue 0 Population is read to see if it is 2. If so, a packet is sent.
4) Queue 1 Population is read to see if it is 2. If so, a packet is sent.
5) Queue 2 Population is read . . . —THREAD 2 PREEMPTS AND CHANGES QUEUE 2 POPULATION!— . . . to see if it is 2. If so, a packet is sent.
6) Queue 3 Population is read to see if it is 2. If so, a packet is sent.

In this scenario, thread 2 woke up while thread 1 was reading Queue 2 data that thread 2 changed. It is possible, since this data is only a 32-bit integer (for the Intel processor used for this embodiment), that the value of the population variable is safe, even if there is a rare, critically-timed preemption. However, because thread 2 can now decide to send a packet, it is undesirable for thread 1 to be still in a state where it will continue to test for packet sending.

Critical sections provide a solution for this condition. The modified implementation is as follows:

1) Pipe 1 gets a byte; Thread 1 is awakened.
2) Thread 1 reads the byte and stores it in Queue 1. Queue 1 Population is incremented.
3) Enter Critical Section 0.
4) Enter Critical Section 1.
5) Enter Critical Section 2.
6) Enter Critical Section 3.
7) Queue 0 Population is read to see if it is 2. If so, a packet is sent.
8) Queue 1 Population is read to see if it is 2. If so, a packet is sent.
9) Queue 2 Population is read to see if it is 2. If so, a packet is sent.
10) Queue 3 Population is read to see if it is 2. If so, a packet is sent.
11) Leave Critical Section 0.
12) Leave Critical Section 1.
13) Leave Critical Section 2.
14) Leave Critical Section 3.

With this procedure, if thread 1 is already in the section of code where it is testing the other queues for packet completion (steps 7, 8, 9, and 10 above) it will have already successfully won access to all four critical sections. This ensures that if another thread preempts, this other thread will not win access to the exposed code. The second thread to try and test packets will be blocked at step 3 until thread 1 is finished.

The control thread of the multiplexer server object is responsible for waiting for requests from the user interface object. It creates the \pipe\MUXCONT pipe and waits for connections to it. When the user interface object sends a control packet to the control thread, the control thread sends the control packet to the multiplexer 30. The control packet may be formatted as follows:

$$['C'][B0][B23][C0][C1][C2][C3]$$

There is a 'C' header that the firmware of controller 32 knows to distinguish from the 'K' data packet header. The next byte sets the baud rates for ACIAs 0 and 1. As each only requires 3 bits of information to set, they are compressed into 2 Baud Rates/Byte. The next byte sets the baud rates for ACIAs 2 and 3. The following 4 bytes are the control bytes for each of the four ACIAs. These are responsible for setting the line characteristics of the ACIAs.

Client Object Description

The client object connects to the multiplexer server object. When this connection is made, the user may type characters in the terminal emulator window. They will be sent to the multiplexer server object which will load the packet it sends downstream with the data such as follows:

$$[4B][00000100][0][0][73][0][0][0][0][0]$$

This example shows the 'K' header (hex 4B), the bitmap, and the 8 bytes of data, with one valid byte destined for the third ACIA (ACIA 2). Bytes coming in from ACIA 2 will, in turn, show up in the terminal window of the client object.

The client object is subject to the behavior of the pipe as specified by the multiplexer server object. In one embodiment of the present invention, the multiplexer server object creates the pipes in PIPE_NOWAIT mode. Accordingly, all connections, reads and writes to the pipe handle will block until data are received or until a timeout period has elapsed. This approach provides effective operations in the threaded environment of Windows NT. With the thread architecture designed as illustrated in FIG. 8, the system is essentially input/output bound and not processor bound, provided the processor is capable of communicating at 115.2 kbps×2 (so there is no net buffering of data). The client uses a similar threaded architecture; one thread blocks waiting for keypresses, and the other blocks waiting for data from the pipe.

Firmware for the Multiplexer Controller Description

The design of the firmware for the controller 32 implements the protocol previously described. The preferred firmware facilitates operation with as little controller cycle usage as possible in an effort to boost the maximum communication bandwidth possible.

The system executes the following operations:

Initialization

Setup MM I/O for $1060–$107F range, 1 cycle clock stretch, and

Issue Master Reset to all ACIAs

Initialize Baud Rates to 19200,n,8,1

Initialize Queue structures
Start ACIAs communicating
Program Loop
* Pull Data in from ACIA 1/Queue it in inbound queue 1
* Pull Data in from ACIA 2/Queue it in inbound queue 2
* Pull Data in from ACIA 3/Queue it in inbound queue 3
* Pull Data in from ACIA 4/Queue it in inbound queue 4
* Push Data out ACIA 1 if present in outbound queue 1
* Push Data out ACIA 2 if present in outbound queue 2
* Push Data out ACIA 3 if present in outbound queue 3
* Push Data out ACIA 4 if present in outbound queue 4
Loop Forever
* In between each access to a downstream ACIA (ACIAs 1–4), process upstream ACIA:
See if there is a byte to pull in from upstream ACIA.
If so, march through the following state table:

| | |
|---|---|
| State 0 | Waiting for packet header |
| State 1 | Waiting for packet bitmap |
| State 2 | Waiting for ACIA 1 byte |
| | When it arrives, place it in ACIA 1 outbound queue |
| State 3 | Waiting for ACIA 2 byte |
| | When it arrives, place it in ACIA 2 outbound queue |
| State 4 | Waiting for ACIA 3 byte |
| | When it arrives, place it in ACIA 3 outbound queue |
| State 5 | Waiting for ACIA 4 byte |
| | When it arrives, place it in ACIA 4 outbound queue |
| State 6 | Waiting for ACIA 1 byte |
| | When it arrives, place it in ACIA 1 outbound queue |
| State 7 | Waiting for ACIA 2 byte |
| | When it arrives, place it in ACIA 2 outbound queue |
| State 8 | Waiting for ACIA 3 byte |
| | When it arrives, place it in ACIA 3 outbound queue |
| State 9 | Waiting for ACIA 4 byte |
| | When it arrives, place it in ACIA 4 outbound queue |
| | Reset to State 0 |

After the inbound nature of the upsteam ACIA is handled, the outbound half is handled:
State 0 Send Packet Header
State 1 See if ACIA 1 queue has data to send, if so, send it; otherwise send dummy
State 2 See if ACIA 2 queue has data to send, if so, send it; otherwise send dummy
State 3 See if ACIA 3 queue has data to send, if so, send it; otherwise send dummy
State 4 See if ACIA 4 queue has data to send, if so, send it; otherwise send dummy
State 5 See if ACIA 1 queue has data to send, if so, send it; otherwise send dummy
State 6 See if ACIA 2 queue has data to send, if so, send it; otherwise send dummy
State 7 See if ACIA 3 queue has data to send, if so, send it; otherwise send dummy
State 8 See if ACIA 4 queue has data to send, if so, send it; otherwise send dummy
State 9 Send bitmap (updated for every valid byte sent upstream)

As the ACIAs are all memory mapped devices, reading a byte from one of them involves loading an accumulator from the status register of the ACIA and testing the appropriate bit. The 6811 has two opcodes that are useful for this:

BRSET will BRanch if a particular bit is SET in the byte, and
BRCLR will BRanch if a particular bit is CLeaR in the byte The code that utilizes these opcodes to read data from an ACIA is as follows:
* Pull in from UART1
*
    LDX #$1000
    BRCLR $61,X,$01, NOCHAR1; If we have no data, skip ahead
    LDAA $1069; If we got one, read it
    LDX #U1INQ; Queue it in the UART 1 inbound queue
    JSR ENQUEUE
NOCHAR1

The X-index register is loaded with $1000 as the BRCLR instruction is used in the X-indexed mode. There is a direct mode that typically uses two fewer cycles to process the instruction, but its use generally requires the memory-mapped device to be located in the first 256 bytes of memory. To move them there would be expected to require executing code within the first 64 cycles after system reset which is problematic if the firmware is run from within the DCT-FAST monitor program. Therefore, the devices may be left at $1060 and up, and X-indexed addressing may be employed.

Next, the lowest bit is tested by using the BRCLR instruction with bit mask $01 against memory location $1061. $1061 is the status register for ACIA 1, and the lowest bit is the "Receive Data Full" indicator bit. If this bit is clear, it means that there are no DATA ready to be read from the ACIA. In this case, the code branches around the section that handles new data. Otherwise, the byte is read in from the ACIA and stored in the queue that is maintained for this connection.

Transmitted data are handled similarly as follows:
*
* Push out to UART1
*
    LDX #$1000
    BRCLR $61,X,$02, NOCHAR5; if we are not free to send data, skip ahead
    LDX #U1OUTQ; see if there are any data in the outbound Q to; send along
    JSR DEQUEUE
    BCS NOCHAR5; Carry set when empty . . . so move along
    STAA $1069; we DID dequeue a value, and we are free to Xmit For this example, bit $02 (Transmit Data Empty) is tested. When clear, the ACIA is not free to transmit new data-it is busy sending one, so it bypasses the send code. When it is set, however, it gets a byte from the correct queue and stores it in the ACIA, causing the ACIA to transmit the character on its outbound of the output port.

In the drawings and specification, there have been disclosed typical preferred embodiments of the invention and, although specific terms are employed, these terms are used in a generic and descriptive sense only and not for purposes of limitation, the scope of the invention being set forth in the following claims.

That which is claimed is:

1. A method for providing cooperative processing in an object oriented communication system, said object oriented communication system comprising:
an object oriented computing environment executing on a computer, said object oriented computing environment comprising:
a multiplexer server object for connecting a plurality of applications generating data for transmission over an asynchronous serial communication port to the asynchronous serial communication port, said multiplexor server object comprising;
    a first communication pipe object for receiving data from a first one of said plurality of applications and routing data to the asynchronous serial communication port; and
    a second communication pipe object for receiving data from a second one of said plurality of applications and routing data to the asynchronous serial communication port;
causing said first communication pipe object to execute in said object oriented computing environment to thereby perform the following steps:
    receiving data from a first one of said plurality of applications;
    queuing received data for routing to the asynchronous serial communication port;
    determining if a selected amount of received data has been queued by one of the first or the second communication pipe objects;
    generating a first packet of data for routing to the asynchronous serial communication port when the selected amount of received data has been queued; and
    routing the first packet of data to the asynchronous serial communication port; and
causing said second communication pipe object to execute in said object oriented computing environment to thereby perform the following steps:
    receiving data from a second one of said plurality of applications;
    queuing received data for routing to the asynchronous serial communication port;
    determining if the selected amount of received data has been queued by one of the first or the second communication pipe objects;
    generating a second packet of data for routing to the asynchronous serial communication port when the selected amount of received data has been queued; and
    routing the second packet of data to the asynchronous serial communication port.

2. A method according to claim 1 wherein the asynchronous serial communication port is coupled to a multiplexer having a plurality of output ports and wherein said routing a first packet step routes the first packet of data to the multiplexer through the asynchronous serial communication port and said routing a second packet step routes the second packet of data to the multiplexer through the asynchronous serial communication port.

3. A method according to claim 2 wherein the first packet of data routed to the multiplexer contains a field associated with each of the plurality of applications and further comprising the following steps:
    generating a bitmap field identifying associated fields of the first packet of data which contain data from an associated one of the plurality of applications and associated fields which contain null data; and
    routing the bitmap field with the first packet of data routed to the multiplexer.

4. A method according to claim 3 wherein the bitmap field is routed to the multiplexer before the first packet of data.

5. A method according to claim 2 wherein the multiplexer server object further comprises:
    a multiplexer control object for establishing communications settings for the plurality of output ports; and
    causing said multiplexer control object to execute in said object oriented computing environment to thereby perform the following steps:
        receiving communications settings for at least one of the plurality of output ports;
        packetizing the received communication settings;
        routing the packet of received communication settings to the multiplexer through the asynchronous serial communication port; and
        configuring the at least one of the plurality of output ports responsive to the packet of received communication settings.

6. A method according to claim 5 wherein each of said plurality of output ports has an associated baud rate and wherein said configuring step comprises the step of configuring a first of said plurality of output ports to a first associated baud rate and a second of said plurality of output ports to a second associated baud rate different from said first associated baud rate.

7. A method according to claim 5 wherein the object oriented computing environment further comprises:
    a user interface object for providing user input of communication settings for the plurality of output ports; and
    causing said user interface object to execute in said object oriented computing environment to thereby perform the following steps:
        displaying a user input display on a monitor;
        receiving user specified communication settings associated with at least one of the plurality of output ports; and
        providing the user specified communication settings to the multiplexer control object.

8. A method according to claim 2 wherein the multiplexer server object further comprises:
    a read object for receiving data from the multiplexer through the asynchronous serial communication port and providing the received data to at least one of the plurality of applications; and
    causing said read object to execute in said object oriented computing environment to thereby perform the following steps:
        receiving a data packet from the multiplexer through the asynchronous serial communication port;
        reconstructing at least one data set from the received data packet;
        determining a selected one of the plurality of applications to which said data set is addressed;
        routing the data set to the selected one of the plurality of applications.

9. A method according to claim 8 further comprising the following steps performed by the multiplexer:
    receiving data from at least one of the plurality of output ports;
    determining if a selected amount of data has been received from the plurality of output ports;
    generating a packet of data for routing to the multiplexer server object through the asynchronous serial communication port if a selected amount of data has been received from the plurality of output ports; and
    routing the packet of data to the multiplexer server object through the asynchronous serial communication port.

10. A method according to claim 9 wherein the packet of data routed to the multiplexer server object contains a field associated with each of the plurality of output ports and further comprising the following steps:

generating a bitmap field identifying associated fields of the packet of data routed to the multiplexer server object which contain data from an associated one of the plurality of output ports and associated fields which contain null data; and routing the bitmap field with the packet of data routed to the multiplexer server object.

11. A method of increasing the utilization of an asynchronous serial communication port on a first computer, the method comprising the following steps:

intercepting a first communication directed to a first communication pipe from a first application executing on a computer;

intercepting a second communication directed to a second communication pipe, different from the first communication pipe, from a second application, different from the first application, executing on a computer;

packetizing the first and second communication to provide a multiplexed data packet;

sending the multiplexed data packet to a multiplexer over the asynchronous serial communication port, wherein the multiplexer includes a plurality of output ports;

receiving the multiplexed data packet at the multiplexer and separating out the first and second communication;

routing the first communication to a first one of the plurality of output ports for transmission at a first baud rate; and routing the second communication to a second one of the plurality of output ports for transmission at a second baud rate.

12. A method according to claim 11 wherein the first baud rate is different from the second baud rate.

13. A method of increasing the utilization of an asynchronous serial communication port on a first computer, the method comprising the following steps:

intercepting a first communication directed to a first communication pipe from a first application executing on a computer;

intercepting a second communication directed to a second communication pipe from a second application executing on a computer;

packetizing the first and second communication to provide a multiplexed data packet;

sending the multiplexed data packet to a multiplexer over the asynchronous serial communication port, wherein the multiplexer includes a plurality of output ports;

receiving the multiplexed data packet at the multiplexer and separating out the first and second communication;

routing the first communication to a first one of the plurality of output ports for transmission at a first baud rate;

routing the second communication to a second one of the plurality of output ports for transmission at a second baud rate;

wherein said packetizing step comprises the following steps:

defining a first field in the multiplexed data package associated with the first application;

defining a second field in the multiplexed data package associated with the second application;

placing data intercepted from the first application in the first field;

determining if any data has been intercepted from the second application but not yet sent to the multiplexer;

placing any data which has been intercepted from the second application but not yet sent to the multiplexer in the second field; and generating a bitmap field in the multiplexed data package identifying the first field as containing data and the second field as containing data if any data was placed in the second field or as null data if no data was placed in the second field; and wherein said routing the second communication step comprises the steps of:

checking the bitmap field to determine if the second field contains data; and routing data from the second field to a second one of the plurality of output ports if the second field contains data.

14. The method of claim 13 wherein the bitmap field is routed to the multiplexer before the second field.

15. The method of claim 11 further comprise the following steps:

receiving communications settings for at least one of the plurality of output ports;

packetizing the received communication settings;

routing the packet of received communication settings to the multiplexer through the asynchronous serial communication port; and configuring the at least one of the plurality of output ports responsive to the packet of received communication settings.

16. A method according to claim 15 wherein each of said plurality of output ports has an associated baud rate and wherein said configuring step comprises the step of configuring a first of said plurality of output ports to a first associated baud rate and a second of said plurality of output ports to a second associated baud rate different from said first associated baud rate.

17. A method according to claim 11 further comprising the following steps:

receiving a data packet from the multiplexer through the asynchronous serial communication port;

reconstructing at least one data set from the received data packet;

determining a selected one of the first or the second application to which said data set is addressed;

routing the data set to the selected one of the first or the second application.

18. A method of increasing the utilization of an asynchronous serial communication port on a first computer, the method comprising the following steps:

intercepting a first communication directed to the asynchronous serial communication port from a first application executing on a computer;

intercepting a second communication directed to the asynchronous serial communication port from a second application executing on a computer;

packetizing the first and second communication to provide a multiplexed data packet;

sending the multiplexed data packet to a multiplexer over the asynchronous serial communication port, wherein the multiplexer includes a plurality of output ports;

receiving the multiplexed data packet at the multiplexer and separating out the first and second communication;

routing the first communication to a first one of the plurality of output ports for transmission at a first baud rate;

routing the second communication to a second one of the plurality of output ports for transmission at a second baud rate;

receiving a data packet from the multiplexer through the asynchronous serial communication port;

reconstructing at least one data set from the received data packet;

determining a selected one of the first or the second application to which said data set is addressed;

routing the data set to the selected one of the first or the second application;

receiving data from at least one of the plurality of output ports;

determining if a selected amount of data has been received from the plurality of output ports;

generating a received packet of data for routing to the asynchronous serial communication port if a selected amount of data has been received from the plurality of output ports; and routing the received packet of data through the asynchronous serial communication port.

19. A method according to claim 18 wherein the received packet of data contains a field associated with each of the plurality of output ports and wherein the step of generating a received packet of data for routing further comprises:

generating a bitmap field identifying associated fields of the received packet of data which contain data from an associated one of the plurality of output ports and associated fields which contain null data; and wherein the step of routing the received packet of data further comprises routing the bitmap field with the received packet of data.

20. An independently configurable serial communication multiplexer circuit comprising:

an asynchronous serial communication port;

a controller coupled to the asynchronous serial communication port, said controller coupled to a data bus;

a plurality of latches each having an input coupled to the data bus and an output;

a first multiplexer having inputs and an output which is coupled to a selected one of the first multiplexer inputs responsive to an output of at least one of the plurality of latches;

a second multiplexer having inputs and an output which is coupled to a selected one of the second multiplexer inputs responsive to an output of at least one of the plurality of latches;

a clock generator having a plurality of baud rate outputs coupled to inputs of the first multiplexer and the second multiplexer;

a first asynchronous communication adapter having a plurality of data inputs coupled to the data bus and a transmit clock input coupled to the output of the first multiplexer;

a second asynchronous communication adapter having a plurality of data inputs coupled to the data bus and a transmit clock input coupled to the output of the second multiplexer; and wherein said controller sets outputs of said plurality of latches over the data bus to select one of the plurality of baud rate outputs as the transmit clock input of the first asynchronous communication adapter and one of the plurality of baud rate outputs as the transmit clock input to the second asynchronous communication adapter.

21. The circuit of claim 20 wherein the controller selects a different one of the plurality of baud rate outputs for each of the asynchronous communication adapters.

22. An apparatus for increasing the utilization of an asynchronous serial communication port on a first computer, the apparatus comprising:

means for intercepting a first communication directed to the asynchronous serial communication port from a first application executing on a computer;

means for intercepting a second communication directed to the asynchronous serial communication port from a second application executing on a computer;

means for packetizing the first and second communication to provide a multiplexed data packet;

means for sending the multiplexed data packet to a multiplexer over the asynchronous serial communication port, wherein the multiplexer includes a plurality of output ports;

means for receiving the multiplexed data packet at the multiplexer and separating out the first and second communication;

means for routing the first communication to a first one of the plurality of output ports for transmission at a first baud rate; and means for routing the second communication to a second one of the plurality of output ports for transmission at a second baud rate.

23. The system of claim 22 wherein the second communication pipe is different from the first communication pipe and wherein the second application is different from the first application.

24. The system of claim 23 wherein the first baud rate is different from the second baud rate.

25. The system of claim 23 wherein said means for packetizing comprises:

means for defining a first field in the multiplexed data package associated with the first application;

means for defining a second field in the multiplexed data package associated with the second application;

means for placing data intercepted from the first application in the first field;

means for determining if any data has been intercepted from the second application but not yet sent to the multiplexer;

means for placing any data which has been intercepted from the second application but not yet sent to the multiplexer in the second field; and means for generating a bitmap field in the multiplexed data package identifying the first field as containing data and the second field as containing data if any data was placed in the second field or as null data if no data was placed in the second field; and wherein said means for routing the second communication comprises:

means for checking the bitmap field to determine if the second field contains data; and means for routing data from the second field to a second one of the plurality of output ports if the second field contains data.

26. The system of claim 23 further comprising:

means for receiving a data packet from the multiplexer through the asynchronous serial communication port;

means for reconstructing at least one data set from the received data packet;

means for determining a selected one of the first or the second application to which said data set is addressed; and means for routing the data set to the selected one of the first or the second application.

27. The system of claim 26 further comprising:

means for receiving data from at least one of the plurality of output ports;

means for determining if a selected amount of data has been received from the plurality of output ports;

means for generating a received packet of data for routing to the asynchronous serial communication port if a selected amount of data has been received from the plurality of output ports; and means for routing the received packet of data through the asynchronous serial communication port.

28. The computer program product of claim 23 wherein the first baud rate is different from the second baud rate.

29. A computer program product for increasing the utilization of an asynchronous serial communication port on a first computer, the apparatus comprising:

a computer-readable storage medium having computer-readable program code means embodied in said medium, said computer-readable program code means comprising:

computer-readable program means for intercepting a first communication directed to the asynchronous serial communication port from a first application executing on a computer;

computer-readable program means for intercepting a second communication directed to the asynchronous serial communication port from a second application executing on a computer;

computer-readable program means for packetizing the first and second communication to provide a multiplexed data packet;

computer-readable program means for sending the multiplexed data packet to a multiplexer over the asynchronous serial communication port, wherein the multiplexer includes a plurality of output ports;

computer-readable program means for receiving the multiplexed data packet at the multiplexer and separating out the first and second communication;

computer-readable program means for routing the first communication to a first one of the plurality of output ports for transmission at a first baud rate; and computer-readable program means for routing the second communication to a second one of the plurality of output ports for transmission at a second baud rate.

30. The computer program product of claim 29 wherein the second communication pipe is different from the first communication pipe and wherein the second application is different from the first application.

31. The computer program product of claim 30 wherein said computer-readable program means for packetizing comprises:

computer-readable program means for defining a first field in the multiplexed data package associated with the first application;

computer-readable program means for defining a second field in the multiplexed data package associated with the second application;

computer-readable program means for placing data intercepted from the first application in the first field;

computer-readable program means for determining if any data has been intercepted from the second application but not yet sent to the multiplexer;

computer-readable program means for placing any data which has been intercepted from the second application but not yet sent to the multiplexer in the second field; and computer-readable program means for generating a bitmap field in the multiplexed data package identifying the first field as containing data and the second field as containing data if any data was placed in the second field or as null data if no data was placed in the second field; and wherein said computer-readable program means for routing the second communication comprises:

computer-readable program means for checking the bitmap field to determine if the second field contains data; and computer-readable program means for routing data from the second field to a second one of the plurality of output ports if the second field contains data.

32. The computer program product of claim 30 further comprising:

computer-readable program means for receiving a data packet from the multiplexer through the asynchronous serial communication port;

computer-readable program means for reconstructing at least one data set from the received data packet;

computer-readable program means for determining a selected one of the first or the second application to which said data set is addressed; and computer-readable program means for routing the data set to the selected one of the first or the second application.

33. The computer program product of claim 32 further comprising:

computer-readable program means for receiving data from at least one of the plurality of output ports;

computer-readable program means for determining if a selected amount of data has been received from the plurality of output ports;

computer-readable program means for generating a received packet of data for routing to the asynchronous serial communication port if a selected amount of data has been received from the plurality of output ports; and computer-readable program means for routing the received packet of data through the asynchronous serial communication port.

* * * * *